July 3, 1962 R. F. EDGAR ET AL 3,042,862
HARDNESS MEASUREMENT
Filed Dec. 30, 1958 4 Sheets-Sheet 2
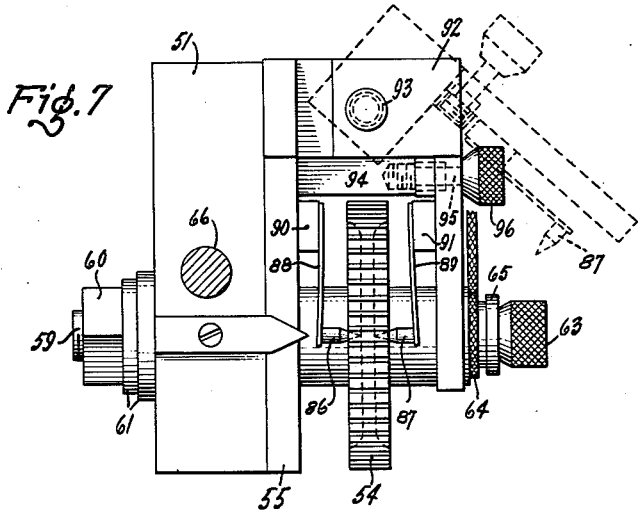
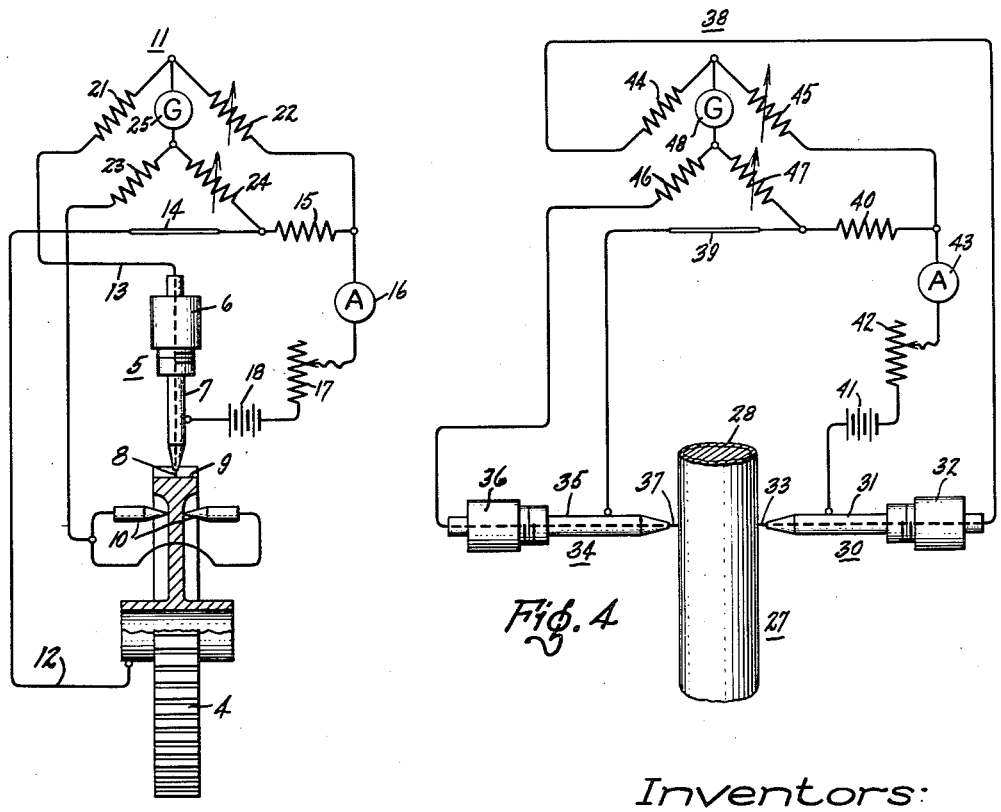
Inventors:
Robert F. Edgar,
Russell E. Tompkins,
by Milton D. Moore
Their Attorney.

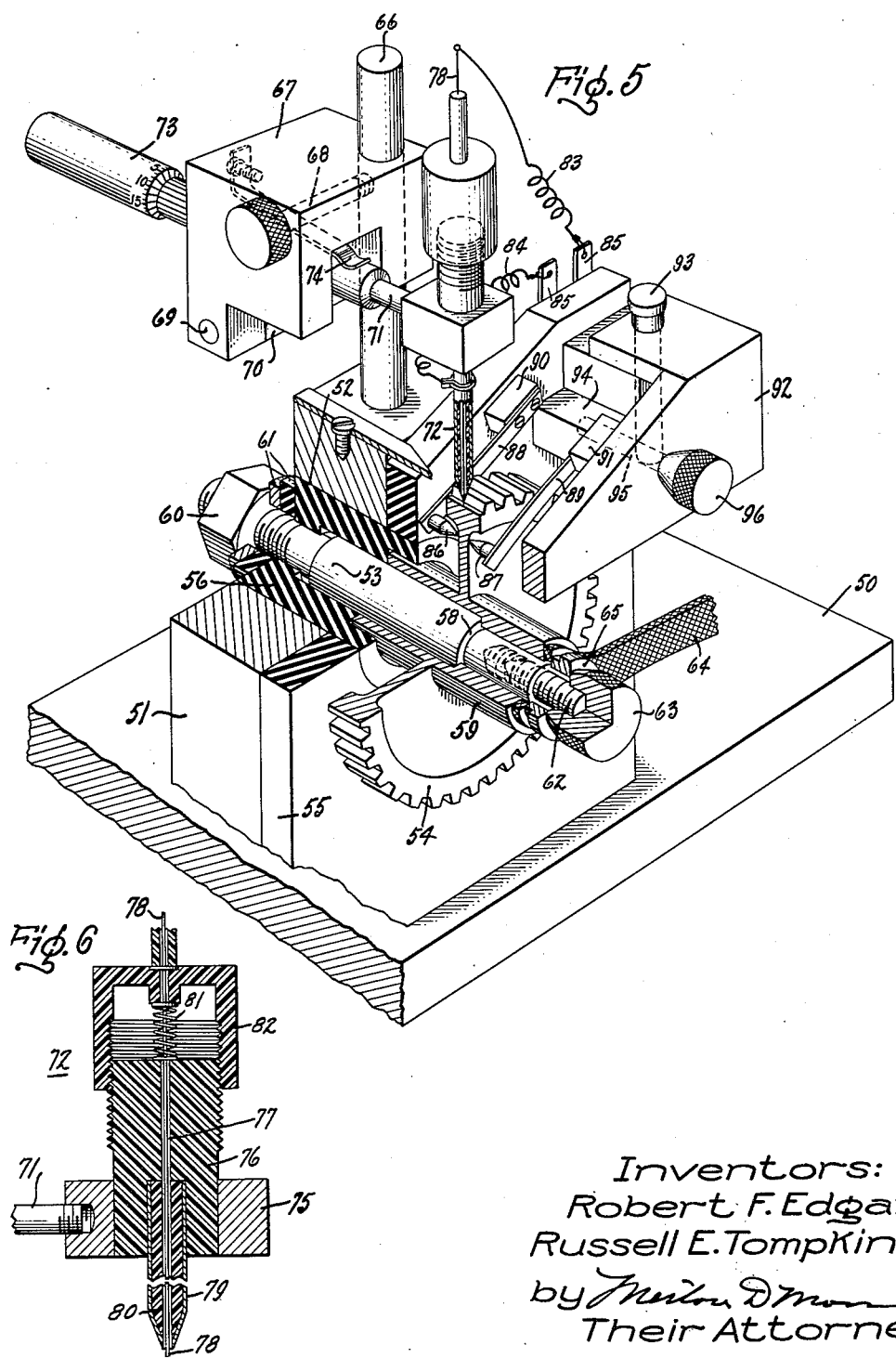

July 3, 1962 R. F. EDGAR ET AL 3,042,862
HARDNESS MEASUREMENT
Filed Dec. 30, 1958 4 Sheets-Sheet 4

Inventors
Robert F. Edgar
Russell E. Tompkins,
by Merton D. Moore
Their Attorney

United States Patent Office 3,042,862
Patented July 3, 1962

3,042,862
HARDNESS MEASUREMENT
Robert F. Edgar and Russell E. Tompkins, Schenectady,
N.Y., assignors to General Electric Company, a corporation of New York
Filed Dec. 30, 1953, Ser. No. 783,879
8 Claims. (Cl. 324—64)

This invention relates to a method and apparatus for non-destructively testing a conducting material to determine the depth of a hardened surface layer. Specifically, the invention contemplates achieving this result by utilizing the difference in resistivity between the hardened layer and the softer core material.

To improve the wear and corrosion characteristics of gears, shafts, axles, etc., these elements are customarily treated to produce a hard surface layer. Depending on the nature of the use to which the hardened part is to be subjected the depth or thickness of the hardened layer must be accurately controlled. Consequently, there is a need for an instrument capable of accurately determining the depth of the hardened layer. Such a test instrument, in order to be useful for testing large numbers of parts on a production line basis, must be rapid, accurate and non-destructive of the part tested.

Hardening a conducting material affects the resistivity thereof and this change in the electrical characteristics may be utilized advantageously to measure the depth of the hardened layer. That is, the resistance of a hardened surface layer of a given depth will be different from the resistance of a similar layer of the unhardened material because of the difference in their resistivities.

Although the resistance of a conducting material has, heretofore, been used to determine the thickness of the material, the technique could only be utilized with materials which were of the same hardness throughout and, hence, had a constant resistivity. That is, the prior art devices were incapable of measuring the depth of a hardened layer on a large core of softer material since in measuring the resistance, the conductivity of the softer core material masks out any effects due to variations in depth of the hardened material. In order to take advantage of the difference in resistivity of the hardened and unhardened layers to determine the depth of the hardened layer, the resistance measurement must be localized in such a manner that a major portion of the measured resistance lies within the maximum depth of hardness expected, whereby variations in depth of hardness cause significant changes in the results by including more or less of a material of different resistivity in the measurement minimizing the effects of the core resistivity.

It is an object of this invention, therefore, to provide a method and apparatus for the non-destructive testing of the depth of a layer of conducting material of one hardness lying in the surface of a material of another hardness.

A further object of this invention is to provide a method and apparatus for the non-destructive measurement of the depth of a hardened conducting layer by means of resistance measurements;

Still another object of this invention is to provide a method and apparatus for measuring the depth of a hardened conducting layer wherein the measurement is substantially localized to the hardened layer;

Yet a further object of this invention is to provide a measuring probe and instrument so designed that an accurate resistance measurement of a hardened metallic layer is obtained as a means for determining the depth of said hardened layer;

Other objects and advantages of this invention will become apparent as the description thereof proceeds.

In accordance with the invention the foregoing objects are accomplished by providing a resistance measuring apparatus including a current probe so constructed that current is injected into the material over a given area rather than at a point. Depending on the probe dimension, the area of current injection is so related to the depth of hardness that the resistance measurement is substantially localized to obtain the hardness characteristics, from the resistivity of the material, over a small region only. In this manner the total measured resistance is substantially that within an area corresponding to the expected depth of hardness and any variations thereof will not be masked by the core resistivity.

The novel features which are characteristic of this invention are set forth with particularity in the appended claim. The invention itself, however, both as to its organization and method of operation, together with other objects and advantages thereof, may best be understood by reference to the following description taken in connection with the accompanying drawings in which:

FIGURE 3 is a diagrammatic illustration of an arrangement for measuring the hardness at the roots of gear teeth;

FIGURE 4 is a similar diagrammatic illustration of an arrangement for measuring the depth of hardness of a round shaft;

FIGURE 5 is a perspective view of a fixture for measuring the depth of hardness of gear teeth;

FIGURE 6 is a detail of the measuring probe utilized in the assembly of FIGURE 5;

FIGURE 7 is a detail of the potential probe mounting assembly of FIGURE 5;

Figure 1:
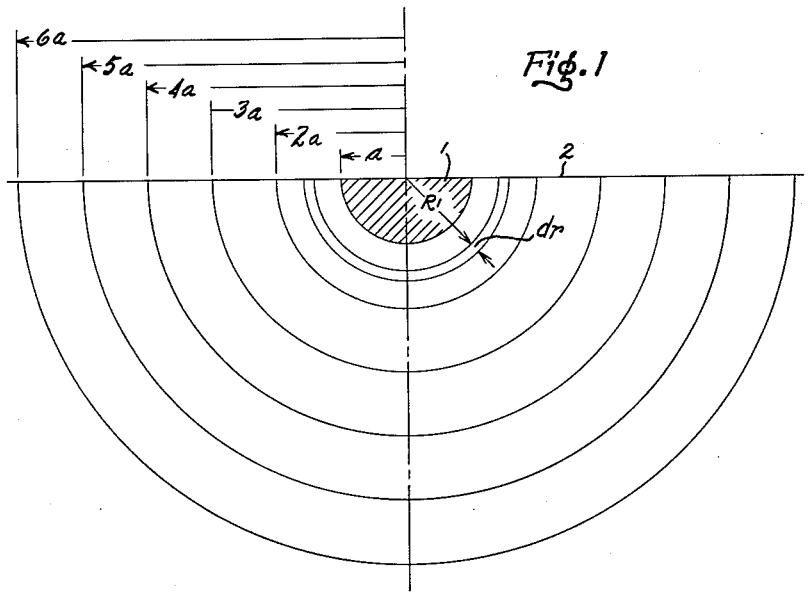
FIGURE 1 is a schematic illustration of an idealized current probe useful in understanding the principles of the instant invention.

As has been pointed out in the preceding paragraphs, the resistance measuring apparatus must be so arranged that substantially all of the measured resistance lies within a relatively small volume located very close to the point at which the current injecting probe makes contact. To grasp how this may be achieved, reference is now made to FIGURE 1 wherein a hemispherical electrode 1 is illustrated as embedded in the surface of a conducting material 2 of resistivity $\rho$. The resistance between the hemispherical electrode 1 and the surrounding material can be shown to be $$R = \frac{\rho}{2\pi a}$$

where $a$ is the radius of the hemisphere. This may be shown by considering the incremental resistance $dR$ of any shell of thickness $dr$, $r$ units from a given point on the surface and may be defined by the equation:

$$dR = \frac{\rho dr}{2\pi r^2} \quad (1)$$

Integrating this equation in order to find the rotal resistance in any hemisphere $$R = \int_{r=a}^{r=\infty} \frac{\rho dr}{2\pi r^2} \quad (2)$$

which may be written as $$R = \frac{\rho}{2\pi} \int_{r=a}^{r=\infty} \frac{dr}{r^2} \quad (3)$$

Carrying out the integration between these limits:

$$R = \frac{\rho}{2\pi}\left[-\frac{1}{r}\right]_a^\infty \quad (4)$$

Substituting the limits causes the equation to take the form $$R = \frac{\rho}{2\pi}\left[0 - \left(-\frac{1}{a}\right)\right] \quad (5)$$

Hence, the total resistance between the hemispherical electrode and the surrounding material turns out to be $$R = \frac{\rho}{2\pi a}$$

From this equation it becomes apparent if the radius of the electrode is doubled the total resistance outside of a hemispherical shell of radius $2a$ is only $$\frac{R}{2}$$

illustrating that half the total resistance R lies between the electrode of radius $a$ and a hemispherical shell of radius $2a$. Similarly, for a hemispherical shell of radius $3a$, 67 percent of the total resistance lies between the electrode and the hemispherical shell of radius $3a$.

Figure 2:
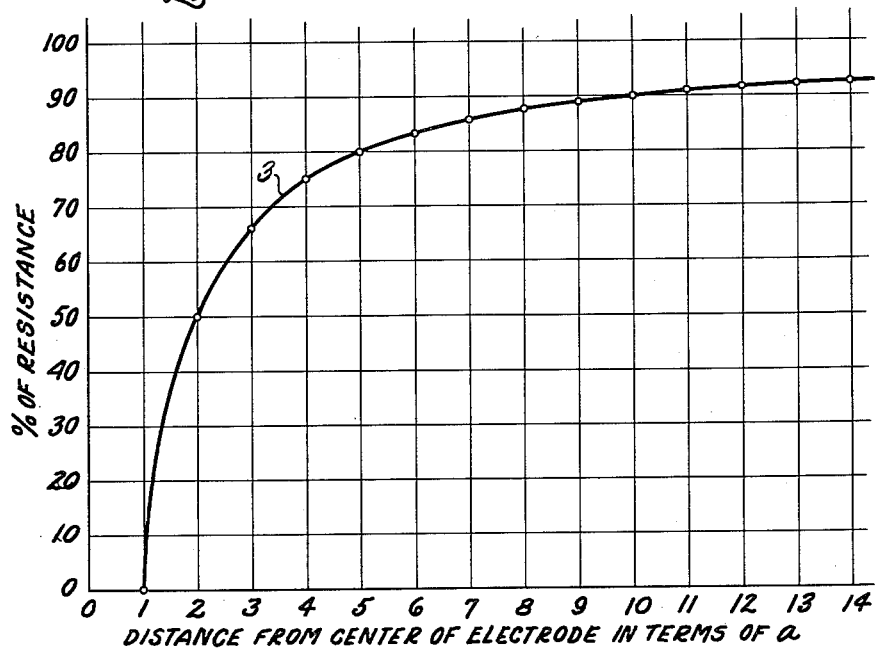
FIGURE 2 illustrates graphically the localizing effect of the current probe illustrated in FIGURE 1.

Plotting the relationship of the percentage of resistance lying between the electrode of radius $a$ and hemispherical shells of differing radii produced the curve 3 of FIGURE 2 wherein the percent resistance is plotted along the ordinate and the distance from the center of the electrode 1 in terms of $a$ along the abscissa. It can be seen from this curve that with an electrode of radius $a$, 80 percent of the total resistance R lies between the electrode 1 and a hemispherical shell having a radius of $5a$. Consequently, if it is desired to measure the depth or thickness of a hardened layer of thickness $t$ by a resistance measurement, by making the hemispherical electrode of a radius $$\frac{t}{5}$$

80 percent of the measured resistance is due to the resistance (and consequently the resistivity) of a layer of the material $t$ units thick. Consequently any variations in the resistivity of the material within that thickness will have a large effect on the measured resistance compared to that of the core material. Thus the resistance measurement is localized since the bulk of the measured resistance lies within the maximum depth of hardness to be expected.

However, to provide an instrumentality in which the data is obtained non-destructively, a current probe of a different configuration is desirable since using a hemispherical electrode would pit the surface being tested. It has been found, that a hollow cylindrical current electrode of radius $a$ produces substantially the same result as a hemispherical electrode of the same radius, for in both instances the current is injected substantially over the same area and hence the equi-potential surfaces underneath a ring electrode due to inward flow of the current are closely hemispherical for radii greater than that of the ring.

The resistance may then be measured by a pair of potential contacts connected to a resistance measuring device such as a Kelvin double bridge, for example, to determine the depth of the hardened layer from the measured resistance. However, to insure that the depth determination is accurate, one of the potential contacts should be positioned in the current injection area, that is, within the cylindrical current probe. Since, as pointed out above, the bulk of the measured resistance lies closely adjacent to the current probe, it will be apparent that a major portion of the voltage drop also takes place in the immediate vicinity and if the potential contact is positioned outside of the current probe that portion of the resistance lying between the current probe and the point of contact of potential element will be lost. Consequently, to obtain the most accurate results, one of the potential contacts should be mounted within the hollow cylindrical current injection probe.

FIGURE 3 illustrates, diagrammatically, an arrangement for measuring the depth of hardness of a gear 4 and particularly at the roots of the individual gear teeth. The input probe 5 comprises a housing 6 which supports, in a manner presently to be described, a hollow cylindrical current injecting probe 7 fashioned from a small copper or brass tube. A potential contact 8 is slidingly mounted within the cylinder 7, and may be formed of enameled copper or a high carbon spring steel material having a low contact resistance. The contact 8 is spring mounted within the housing 6 and may be pressed upwardly to permit the current injecting electrode 7 to come into contact with the gear root 9. A pair of voltage pickup contact probes 10, shown bearing against the web of the gear 4, and the contact 8, measure the voltage drop which occurs substantially within a localized area in the vicinity of the gear root surface 9.

The various contact elements are connected to a resistance measuring Kelvin bridge 11 through the leads 12 and 13. Thus, current flows from the probe 7 through gear 4 and from gear 4 through a low resistance link 14 and a standard resistance 15 of the Kelvin bridge. The current path is completed through an ammeter 16, a current regulating rheostat 17 to a current source such as the battery 18 the positive terminal of which is connected to the current injection probe 7.

A pair of known, non-inductive resistances 21 and 22 are connected in series between the potential contact 8 and one end of the standard resistance 15 while a corresponding pair of series connected resistances 23 and 24 are connected between the potential contacts 10 and the other end of the standard resistance 15. The resistances 22 and 24 are variable and are so connected to the remaining resistances 21 and 23 that they form two sets of ratio arms with a sensitive galvanometer 25 connecting the junction points of the resistances 21 and 22 and the junctions of the resistances 23 and 24. The ratio $$\left(\frac{R_{21}}{R_{22}}\right)$$

is always equal to the ratio $$\left(\frac{R_{23}}{R_{24}}\right)$$

and these ratios are varied until zero deflection of the galvanometer 25 is obtained. When the bridge 11 is thus balanced, the unknown localized resistance X of the gear is defined by the following relationship:

$$\frac{X}{R_{15}} = \frac{R_{21}}{R_{22}} = \frac{R_{23}}{R_{24}}$$

from which the value of X may easily be obtained.

Variations in measured resistance along the gear root, between different gear teeth, or between different gears represent variations in depth of hardness because the difference in resistivity between the hardened layer and the softer core material will have a substantial effect on the measured resistance. For example, with a 50 mil diameter current injecting probe, eighty percent (80%) of the total measured resistance is due to the electrical resistance of the material in a layer extending 250 mils below the gear root. If the gear is hardened to a depth of exactly 250 mils, measured resistance will have a given value determined substantially by the resistivity $\rho$ of the hardened material. If, however, the hardened layer is less than 250 mils thick, the total resistance of the 250 mil layer is less since the layer also includes some of the softer core material which has a lower resistivity than the hardened material. In this manner, for given material and a current probe of given diameter, the resistance measurement may be directly correlated with the depth of hardness of the surface layer.

As shown in FIGURE 4, it is also possible to measure the depth of hardened layer on a shaft or axle. A shaft 27 having a hardened surface layer 28 may be measured by bringing a current injecting probe 30 and a pickup probe 34 to bear on opposite sides of the shaft. The probe 30 comprises a current injecting cylinder probe 31 mounted in a housing 32 and a potential contact 33 slidably mounted within the cylinder 31. The pickup probe 34 similarly comprises a cylindrical current element 35 mounted in a housing 36 and a potential contact 37 slidably mounted within the cylinder 35. Current contacts 31 and 35 are spring mounted within their respective housings so that both of the cylindrical current contacts may be brought to bear against the outer surface of the shaft 27.

The current and potential contact members are coupled to a resistance measuring Kelvin bridge arrangement shown at 38. The bridge 38 includes a low resistance link 39 and a standard resistance 40 which are connected between the current pickup probe 35 and the current injecting probe 31 through a current source such as the battery 41, the current controlling rheostat resistance 42 and an ammeter 43. The potential contacts 33 and 37 are connected respectively through ratio resistances 44, 45, 46, and 47 to opposite sides of the standard resistance 40. A sensitive galvanometer 48 is connected between the respective junction points of the ratio resistance pairs 44, 45, 46 and 47 which resistances are adjusted in tandem until zero deflection of the galvanometer and from which an indication of the resistance and depth of the hardened layer 28 may be obtained.

FIGURE 5 illustrates a fixture suitable for testing gears and comprises a base plate 50 supporting a mounting frame 51. A central bore 52 in the frame 51 supports a spindle 53 upon which gear members 54 may be mounted for testing purposes. An insulating spacer 55 is positioned between the frame 51 and the gear 54 to prevent accidental contact between the metallic frame and the gear. The insulating spacer 55 has a central opening aligned with the bore 52 in the frame 51 which supports a cylindrical insulating bushing 56 through which the mounting spindle 53 passes. The gear hub 59 is mounted on the spindle 53 and engages a shoulder 58 on the spindle. The left end of the spindle 53 is externally threaded and has a nut 60 and a pair of washers 61 threaded thereon. The right hand end of spindle 53 is internally threaded and receives a threaded bolt 62 which has a knurled cap 63. A braided current conductor 64 is mounted on the bolt 62 and is urged against the gear hub by means of a washer 65 and the knurled cap 63. The braided conductor 64 acts as a current pickup contact which is connected to the proper terminal of a resistance measuring Kelvin bridge.

Supported on the frame 51 is a post 66 upon which a current probe mounting frame 67 is adjustably mounted. The frame 67 is fixed to the post 66 by a screw 68 which bears against the post. The entire assembly may be raised and lowered at will by releasing the screw 68 and sliding frame 67 to any given position. Mounted in the frame 67 and supported for pivotal movement on the pin 69 is an insert 70 which bears a spindle 71 having a contact probe assembly 72 mounted at the end thereof. The spindle 71 is slidably mounted in a micrometer sleeve 73 which is operated manually to move probe 72 to the right and left along the gear teeth of the gear 54. A leaf spring 74, one end of which is fastened to the frame 67, bears against the sleeve 73 and urges the entire assembly downward to maintain a firm contact between the probe 72 and the gear 54.

The probe 72, as shown in detail in FIGURE 6, includes a plate 75, which supports an externally threaded cylindrical insulating plug 76. A central bore 77 in the plug 76 receives a wire electrode 78 which may be fabricated from a flexible high carbon spring steel. A cylindrical current injecting electrode 79 is embedded in the lower end of the plug 76 and includes an insulating jacket 80 through which the spring electrode 78 passes. The potential contact 78 is maintained in its extended position beyond the end of the electrode 79 by means of a spring 81 located between the upper end of the plug 76 and a cap 82 threaded to the plug.

The contact 78 and the cylinder 79 are connected by means of pigtail connections 83 and 84 (see FIGURE 5) to a pair of terminal posts 85 for connection to the terminals of a resistance measuring bridge and to a current source. A pair of probes 86 and 87 mounted on leaf springs 88 and 89 contact the web of the gear 54 and constitute the remaining potential pickup probe. The springs 88 and 89 are secured to mounting blocks 90 and 91 which are connected electrically and brought to the one terminal of a resistance measuring bridge, not shown. The spring 89 and the contact 87 are secured to a movable side wall 92 which is pivotally secured to a post 93, mounted in a bracket 94 extending from the spacer 55. Side wall 92 is thus free to swing outwardly into the open position, as may be seen most clearly in FIGURE 7, to disengage the contact 87 and permit removal of the gear 54. A screw 95 having a knurled cap 96 passes through the side wall 92 and is threaded into the bracket 94 to lock the side wall 92 in position during operation, maintaining contact 87 in contact with the web of the gear 54.

In operation, the probe 72 is moved along the gear root by means of the micrometer head 73 to take resistance measurements representative of the depth of hardness at various points along the root of the gear teeth. Whenever a measurement is to be taken along any particular position along the gear tooth, the micrometer handle 73 is moved upwards moving electrode 78 against the tension of the spring 81 until the current injecting cylinder 79 is brought into engagement with the gear root. The Kelvin bridge is then balanced and the resistance is determined providing an indication of depth of the hardened layer.

After the depth of hardness along the root of a particular gear tooth has been measured the side wall 92 is released freeing the potential probe 87 from the gear. The micrometer handle 73 is pushed down pivoting the insert 70 about the pin 69 and swinging the probe 72 up against the action of the leaf spring 74. The gear 54 is removed from the spindle 53 and rotated to bring another gear tooth into testing position beneath the probe 72. The probe 72 is released to move downwardly and come into contact with the root of the new gear tooth and the side wall 92 is swung back to urge potential contact 87 against the web of the gear 54. Resistance measurements along the root of the new gear tooth may now be undertaken to determine the depth of hardness.

In the event that a gear of smaller or larger diameter is to be measured, the screw 68, which holds the frame 67 and the contact probe 72 in a fixed position, a released and the entire frame 67 is moved along the post 66 to the proper height for accommodating the given gear 54. In a similar manner the insulating bushing 52 and the supporting spindle 53 may be removed and different ones thereof substituted to accommodate various gear hubs.

Figure 8:
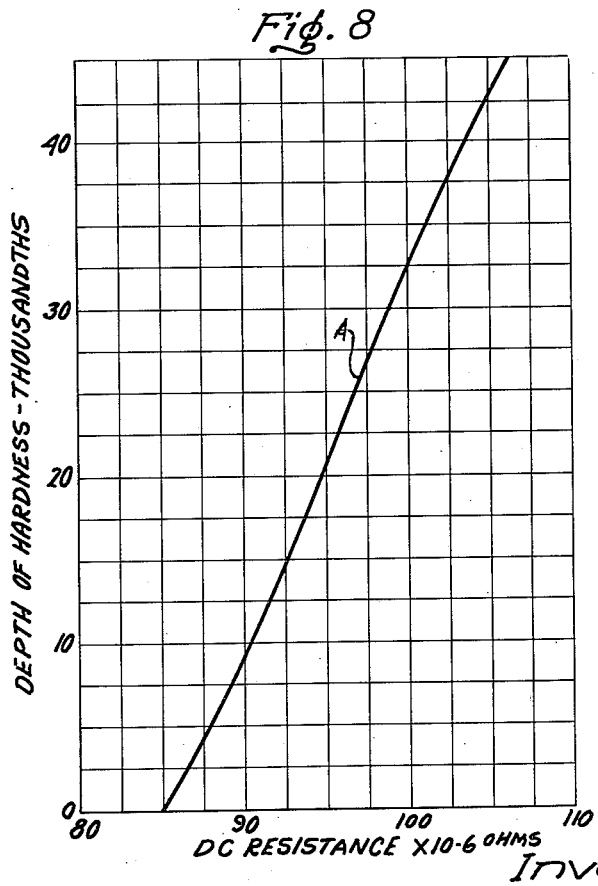
FIGURE 8 is a graph showing the relationship between depth of hardness and measured resistance useful in interpreting the data obtained from the instrumentality of the instant invention.

The following example is set forth, by way of demonstration only and without limiting the scope of invention, to illustrate how the depth of hardness may be determined from the localized resistance measurements. A number of ⅜ inch diameter high carbon steel round bars were obtained and induction hardened to various depths. Included were round bar specimens which were not hardened and specimens hardened throughout the cross-section. The various round bars were then subjected to resistance measurement utilizing a 160 mil current injecting probe. Measurements were taken at different axial positions of the various test bars rod as well as at different positions around the rod. The individual specimens were then cut at the points of measurements and etched to reveal the true depth of hardness. The resistance measurements taken at the various points were then correlated with the actual depth of hardness found by means of the etching processes, and the depth of hardness in thousandths of an inch were plotted against the D.C. resistance in microhms to produce the curve A illustrated in FIGURE 8. This curve shows a definite correlation between the depth of hardness and the measured resistance. Having plotted the data obtained from these tests as curve A of FIGURE 8, the curve may be utilized in testing the depth of hardness for similar materials utilizing a probe of the same dimension. A curve, similar to curve A of FIGURE 8, is then plotted for probes of different sizes.

Hence, in carrying out the invention similar calibration curves are obtained in this same manner for probes of varying dimensions and for conducting materials of various types. That is, for rods, gears or any other conducting elements to be measured, similar calibration curves must be obtained by hardening a number of samples to different depths and measuring their resistance with a given probe, and then correlate the measured resistance and the actual depth of hardness by cutting and etching the sample elements. Once this calibration curve is obtained for a given probe dimension and for a given material, further tests can be carried out on a continuous production line basis and the resistance measured interpreted directly in terms of depth of hardness.

Figure 9:
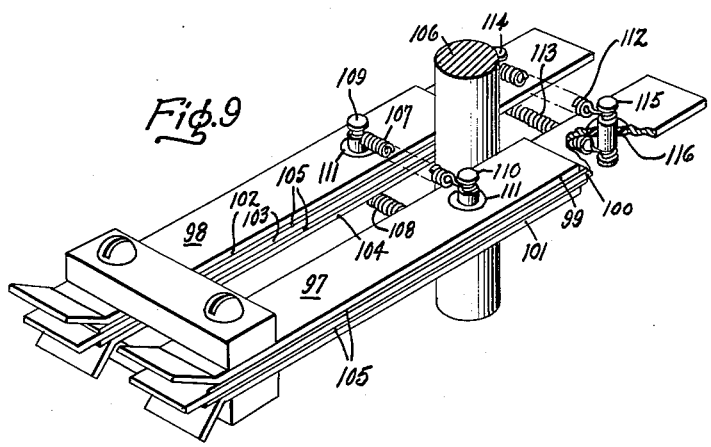
FIGURE 9 illustrates an alternative embodiment of the measuring probe.

Although the preferred embodiment of this current probe, as illustrated in FIGURES 5 and 6, utilizes a hollow cylindrical configuration, a probe of slightly different configuration may also be used. FIGURE 9 illustrates such an alternative construction in which the current injecting electrodes are two parallel flat electrodes. It must be pointed out that as long as the current is injected over an area rather than at a single point the current spreads generally in the same fashion as it does with a hemispherical electrode and the equi-potential surfaces beneath the surface of the conducting material will be generally of hemispherical shape and the principles postulated in describing the principles of the invention are valid. Thus in FIGURE 9 a round bar to be tested is positioned between two probes 97 and 98 consisting of three spaced metallic plates 99, 100, 101, 102, 103, and 104 separated by layers of insulating material 105. Current is admitted to the specimen 106 through the two outside strips 99 and 101 and removed by the two outside strips 102, and 104 of the other probe. The center strips 100 and 103 on the other hand are the potential contacts to measure the potential drop across the specimen 106. Contact between the specimen 106 and the probes 97 and 98 is facilitated by means of spring members 107, 108, 112 and 113 which urges the probes into firm contact with the specimen.

The springs 107 and 108 are secured to a pair of mounting posts 109 and 110 projecting through the individual leaves and insulated therefrom by means of the insulating bushings 111. The springs 112 and 113 are secured to a similar pair of mounting posts 114 and 115 secured in an insulating bushing 116 secured in the leaves 100 and 103. Thus the flat contacts are maintained in firm contact with the specimen 106 insuring good contact and reducing contact resistance to a minimum.

In describing the instant invention, the invention has been described in terms of a homogeneous conducting material which has a hardened layer on the surface. It is apparent, however, that the invention is not limited to measuring the depth of homogeneous layer of different hardness but that the invention is equally applicable to measuring the depth of plated material or cladding as long as the hardness, and hence the resistivity, of the plated or cladded layer is different than the hardness and resistivity of the core material. Thus the invention is applicable to the measurement of the depth of any layer of conducting material which is superimposed on a core of different hardness and different resistivity.

While a particular embodiment of the invention has been described and shown, it will of course, be understood that it is not limited thereto since many modifications and variations in the method and the circuit arrangements and instrumentalities for carrying out the invention may be made. It is contemplated that the appended claims cover any such modifications as fall within the true spirit and scope of this invention.

What we claim as new and desire to secure by Letters Patent of the United States is:

1. A device for measuring the depth of a layer of one hardness in a specimen having a core of a different hardness, comprising resistance measuring means including potential and current probes for injecting current into said specimen and measuring the potential drop occurring in a limited portion of said specimen, the dimensions of said current probe being such that said probe makes contact with the specimen over an area which is a predetermined fractional portion of the depth of said layer so that current is injected substantially over the same area and the measured resistance lies substantially within the hardened layer, and measuring means coupled to said current and potential probes for measuring the resistance to provide an indication of the depth of the hardened layer.

2. A device for measuring the depth of a layer of one hardness in a specimen having a core of a different hardness, comprising a current electrode making contact over an area of the specimen surface to inject current into said material over said surface area, the dimensions of said electrode being so proportioned so that substantially all of the voltage drop in said specimen occurs in that portion of the specimen including the hardened layer, potential electrodes positioned within the current injection area to determine the voltage drop, and bridge means coupled to said electrodes to measure the resistance whereby the measured resistance is substantially the resistance of the portion including the hardened layer.

3. In a device for measuring the depth of hardness of a surface hardened specimen, the combination comprising a current electrode making contact with a predetermined area on the surface of said specimen to inject current substantially over that surface area and obtain a localized resistance measurement, the size of said electrode being a predetermined fraction of the hardened film of the specimen so that substantially all of the voltage drop takes place within the hardened film, potential electrodes to determine the potential drop produced by said current within the film, one of said potential electrodes being positioned within the area of current injection, and means coupled to said current and potential electrodes for measuring the resistance in the selected portion of the specimen which includes the hardened film.

4. A device for measuring the depth to which a specimen has been hardened, comprising a hollow current electrode adapted to contact the surface of a specimen to inject current substantially over the entire area enclosed by said electrode, the area enclosed by said electrode being a predetermined fraction of the portion of the specimen to be measured so that substantially all of the potential drop due to the injected current takes place within the selected portion, means to measure the potential drop in the selected portion of the specimen including an electrode positioned within said hollow electrode and contacting said specimen in the area of current injection, and means coupled to said electrodes for measuring the resistance in the selected portion of the specimen to determine depth of hardness.

5. A device for measuring the depth of a hardened film, comprising a hollow cylindrical current electrode adapted to contact the surface of a specimen to inject current substantially over the entire area enclosed by said electrode, the area enclosed by said electrode being a predetermined fraction of the hardened film of the specimen to be measured so that substantially all of the voltage drop takes place within the hardened film, means to measure the potential drop in the specimen including an electrode slidably positioned within said hollow electrode and contacting said specimen in the area of current injection, and means coupled to said electrodes for measuring the resistance in the selected portion of the specimen to determine depth of hardness.

6. In a resistance measuring device for determining the depth of a hardened layer of thickness $t$ on a treated specimen having a core of softer material, the combination comprising a cylindrical current electrode of radius $$\frac{t}{b}$$

where $b>1$, to inject current into said specimen over an area of radius $$\frac{t}{b}$$

to localize the resistance measurement substantially to a layer of thickness $t$, potential sensing means to determine the potential drop in said layer including a potential electrode positioned within the area of current injection, and resistance measuring means coupled to said potential means and said current electrode to measure the resistance in said layer so that the depth of said hardened layer may be determined.

7. In a resistance measuring device for determining the depth of a hardened layer of thickness $t$ on a treated specimen having a core of softer material, the combination comprising a hollow cylindrical current electrode of radius $$\frac{t}{b}$$

for injecting current into said specimen over an area of radius $$\frac{t}{b}$$

where $b>1$ and lies in the range $2<b\leq 5$, to localize the resistance measurement substantially to a layer of thickness $t$, and potential sensing means to determine the potential drop in said layer including a potential electrode slidably positioned within said current electrode to contact said specimen within the area of current injection, and resistance measuring means coupled to said potential means and said current electrode to measure the resistance in said layer so that the depth of said hardened layer may be determined.

8. In a device for making depth of hardness determinations by resistance measurements, the combination comprising means to support a specimen for measurement including a spindle upon which said specimen is mounted, probe means adapted to contact said specimens and including a hollow current electrode to inject current over an area of the specimen which is a selected fraction of the depth of hardness whereby the resistance measurement is localized over a desired portion of the specimen, and a potential electrode positioned within said current electrode to make contact with said specimen in the area of current injection, and means supporting said probe means for movement relative to said specimen to permit measurements at various points on said specimen.

References Cited in the file of this patent
UNITED STATES PATENTS

| | | |
|---|---|---|
| 1,895,643 | Putnam | Jan. 31, 1933 |
| 2,485,881 | Helin | Oct. 25, 1949 |
| 2,586,868 | Scott | Feb. 26, 1952 |
| 2,763,935 | Whaley et al. | Sept. 25, 1956 |
| 2,811,691 | Dahm et al. | Oct. 29, 1957 |